(12) United States Patent
Neumann

(10) Patent No.: US 12,742,648 B2
(45) Date of Patent: Sep. 22, 2026

(54) METHOD OF AND SYSTEM FOR PATH SELECTION

(71) Applicant: KPN INNOVATIONS LLC, Lakewood, CO (US)

(72) Inventor: Kenneth Neumann, Lakewood, CO (US)

(73) Assignee: KPN Innovations LLC, Lakewood, CO (US)

( * ) Notice: Subject to any disclaimer, the term of this patent is extended or adjusted under 35 U.S.C. 154(b) by 0 days.

(21) Appl. No.: 18/745,618

(22) Filed: Jun. 17, 2024

(65) Prior Publication Data

US 2024/0337496 A1 Oct. 10, 2024

Related U.S. Application Data

(63) Continuation-in-part of application No. 17/540,616, filed on Dec. 2, 2021, now Pat. No. 12,018,948, which is a continuation-in-part of application No. 16/983,043, filed on Aug. 3, 2020, now Pat. No. 11,215,467.

(51) Int. Cl.
*G01C 21/34* (2006.01)

(52) U.S. Cl.
CPC ....... *G01C 21/343* (2013.01); *G01C 21/3415* (2013.01)

(58) Field of Classification Search
CPC ... G01C 21/343; G01C 21/3415; G06N 20/00
See application file for complete search history.

(56) References Cited

U.S. PATENT DOCUMENTS 8,200,548 B2 6/2012 Wiedl
9,569,745 B1 2/2017 Ananthanarayanan et al.
10,026,055 B2 7/2018 Riel-Dalpe et al.
(Continued)

OTHER PUBLICATIONS

Liao, Wenzhu & Zhang, Liuyang & Wei, Zhenzhen. (2020). Multi-objective green meal delivery routing problem based on a two-stage solution strategy. Journal of Cleaner Production. 258. 120627. 10.1016/j.jclepro.2020.120627.
(Continued)

*Primary Examiner* — Ryan Rink
(74) *Attorney, Agent, or Firm* — Caldwell LLC

(57) ABSTRACT

A system for path selection, the system comprising a computing device, wherein the computing device is configured to receive a plurality of alimentary elements and a plurality of destinations. Computing device may compute, using the plurality of alimentary elements and the plurality of destinations, a projected combination as a function of an objective function, wherein computing is based on completion time and destination. Computing device may determine a combination ranking by generating a batching objective function, wherein the function generates an output ranking according to at least a target criterion and selects a combination. Computing device may provide batching instructions to a user. Computing device may determine a predicted path for the plurality of alimentary elements wherein the predicted path is updated as a function of each alimentary element that has reached its destination. Computing device may provide the predicted path to a user.

18 Claims, 8 Drawing Sheets

(56) References Cited

U.S. PATENT DOCUMENTS

| | | | |
|---|---|---|---|
| 10,762,378 | B2 | 9/2020 | Mehring et al. |
| 10,977,606 | B1 | 4/2021 | Mimassi |
| 11,521,171 | B2 | 12/2022 | Mimassi |
| 2002/0004749 | A1 | 1/2002 | Froseth et al. |
| 2004/0210621 | A1 | 10/2004 | Antonellis |
| 2010/0280895 | A1 | 11/2010 | Mottola |
| 2014/0058794 | A1 | 2/2014 | Malov et al. |
| 2015/0227888 | A1 | 8/2015 | Levanon et al. |
| 2016/0372005 | A1 | 12/2016 | Bajpai et al. |
| 2017/0024789 | A1 | 1/2017 | Frehn et al. |
| 2017/0372197 | A1 | 12/2017 | Baughman et al. |
| 2018/0293638 | A1 | 10/2018 | Simpson |
| 2018/0308066 | A1 | 10/2018 | Hadatsuki |
| 2019/0043143 | A1 | 2/2019 | Camacho et al. |
| 2019/0114564 | A1 | 4/2019 | Ferguson et al. |
| 2019/0130354 | A1 | 5/2019 | Han et al. |
| 2019/0164126 | A1 | 5/2019 | Chopra et al. |
| 2019/0178672 | A1 | 6/2019 | Woolley |
| 2019/0178679 | A1 | 6/2019 | Woolley |
| 2019/0266557 | A1 | 8/2019 | Berk et al. |
| 2019/0340561 | A1 | 11/2019 | Rajkhowa et al. |
| 2019/0385121 | A1 | 12/2019 | Waliany et al. |
| 2020/0065892 | A1 | 2/2020 | Brown |
| 2020/0097907 | A1 | 3/2020 | Yao et al. |
| 2020/0167722 | A1 | 5/2020 | Goldberg |
| 2020/0183414 | A1 | 6/2020 | Shih et al. |
| 2020/0184387 | A1 | 6/2020 | Lakelayeh et al. |
| 2020/0240803 | A1 | 7/2020 | Rao et al. |
| 2025/0117740 | A1* | 4/2025 | Mimassi .......... G06Q 10/08355 |

OTHER PUBLICATIONS

Reyes, Damian, Alan L. Erera, Martin W. P. Savelsbergh, Sagar Sahasrabudhe and Ryan O'Neil. "The Meal Delivery Routing Problem." (2018).

Ejim, Samson. (2016). Implementation of Greedy Algorithm in Travel Salesman Problem. 10.13140/RG.2.2.23921.48485.

* cited by examiner 500
132
504
N
#1
#2
#3
#4
#5
#6

METHOD OF AND SYSTEM FOR PATH SELECTION

CROSS-REFERENCE TO RELATED APPLICATIONS

This application is a continuation-in-part of Non-provisional application Ser. No. 17/540,616 filed on Dec. 2, 2021, now U.S. Pat. No. 12,018,948, issued on Jun. 25, 2024, and entitled "METHOD OF AND SYSTEM FOR PATH SELECTION," which is a continuation-in-part of Non-provisional application Ser. No. 16/983,043 filed on Aug. 3, 2020, now U.S. Pat. No. 11,215,467, issued on Jan. 4, 2022, and entitled "METHOD OF AND SYSTEM FOR PATH SELECTION," the both of which are incorporated herein by reference.

FIELD OF THE INVENTION

The present invention generally relates to the field of machine-learning. In particular, the present invention is directed to a method of and system for path selection.

BACKGROUND

Efficient path selection using route guidance is an increasingly vital process for provisioning of alimentary combinations. However, existing methods for path selection using route guidance suffer from inaccuracy in predictions used to support further computations and are not well suited to updating predictions in real-time.

SUMMARY OF THE DISCLOSURE

In an aspect, a system for path selection comprises a computing device configured to streamline the delivery process of alimentary elements from multiple vendors. The system receives various alimentary elements, each associated with a vendor location and a projected order completion time, along with at least one delivery destination. The computing device then selects a candidate batching combination by generating and optimizing an objective function that groups alimentary elements based on their projected completion times and vendor locations. This optimization is performed with a target criterion in mind, ensuring efficient batching. Once the candidate batching combination is selected, the system determines a predicted path for the physical transfer of these elements using a destination machine-learning process. It then selects an appropriate physical transfer apparatus based on the batching combination and transmits the predicted path to this apparatus. The system continuously updates the predicted path as each alimentary element is retrieved from its respective vendor location, ensuring optimal delivery. Finally, the physical transfer apparatus delivers the alimentary elements to the destination based on the updated predicted path, ensuring timely and efficient delivery.

In another aspect, an exemplary method of path selection is disclosed. A method for path selection involves using a computing device to optimize the delivery process of alimentary elements from multiple vendors. The method begins by receiving a plurality of alimentary elements from two or more vendors, with each element associated with a vendor location and a projected order completion time. The computing device also receives at least one delivery destination. It then selects a candidate batching combination by generating an objective function that groups alimentary elements based on their projected completion times and vendor locations. This objective function is optimized according to a target criterion, and the candidate batching combination is selected based on the optimized function. The method further involves determining a predicted path for the physical transfer of the selected batching combination using a destination machine-learning process. The computing device selects an appropriate physical transfer apparatus based on the candidate batching combination and transmits the predicted path to this apparatus. As each alimentary element is retrieved from its respective vendor location, the computing device updates the predicted path using the destination machine-learning process. Finally, the computing device directs the physical transfer apparatus to deliver the alimentary elements to the destination according to the updated predicted path, ensuring efficient and timely delivery.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for path selection. Embodiments described in this disclosure establish alimentary combinations based on delivery location, and determine routes associated with orders based on the projected order completion times; route assignments to couriers are guided using an objective function. Objective function may be expressed as a loss function or score calculation, which may be evaluated using greedy algorithms, linear programming, mixed-integer linear programming, or the like. Embodiments may be used to update the route guidance in real-time as deliveries are made by using a machine-learning process and a mapping algorithm. Mapping algorithm may be expressed as a loss function or score calculation, which may be evaluated using greedy algorithms, linear programming, mixed-integer linear programming, or the like.

Figure 1:
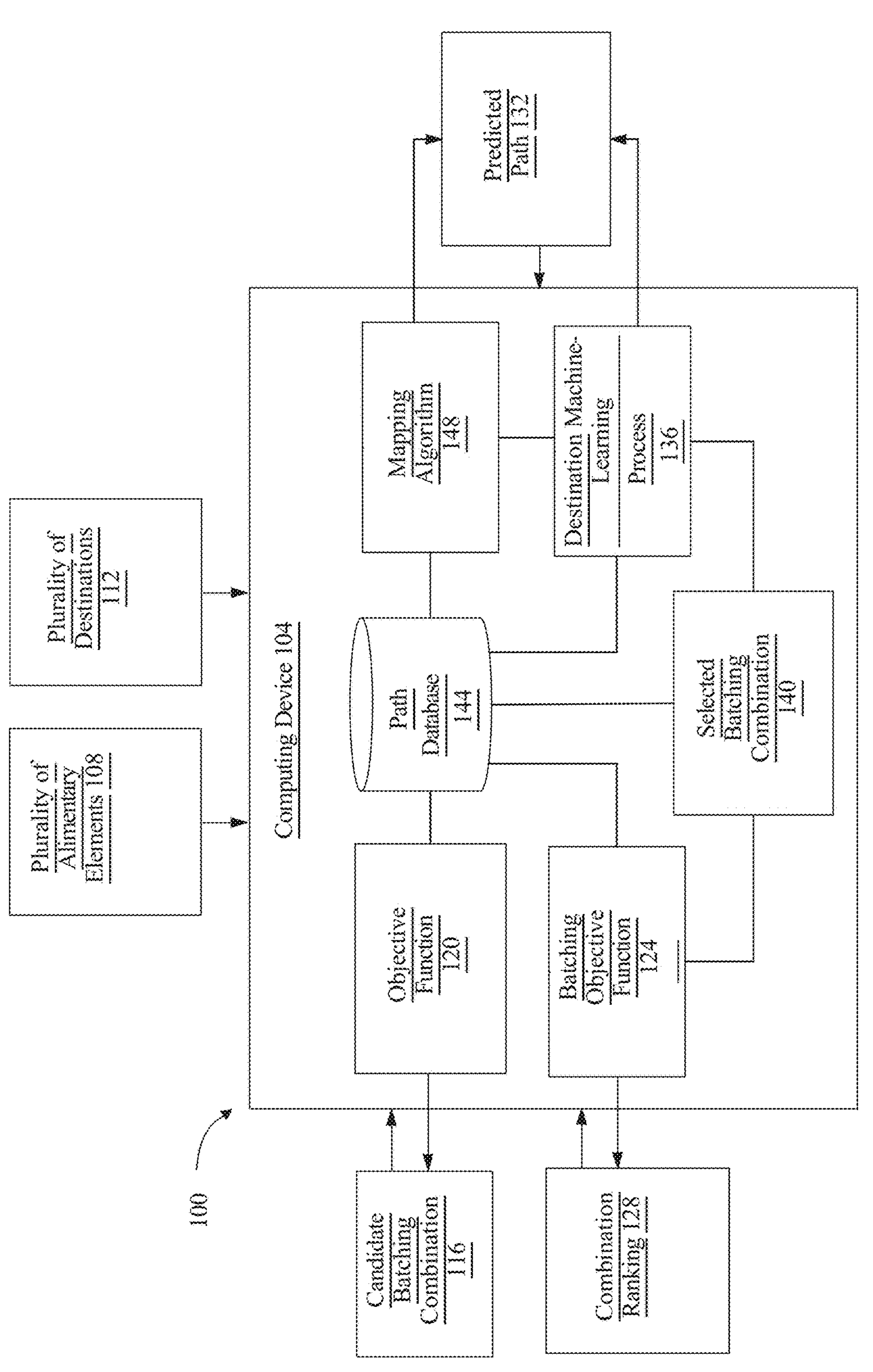
FIG. 1 is a block diagram of an exemplary embodiment of a system for path selection.

Referring now to FIG. 1, an exemplary embodiment of a system 100 for path selection is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 may receive a plurality of alimentary elements 108 and a plurality of destinations 112, wherein receiving a plurality of alimentary elements 108 and a plurality of destinations 112 may include receiving data corresponding to order placement time of alimentary elements, projected order completion time of alimentary elements, and alimentary element destination. An "alimentary element," as used in this disclosure is any meal, grocery item, food element, or the like, that may be generated by a restaurant, cafeteria, fast food chain, grocery store, deli, or any place that would have a need for providing an alimentary item to a customer, client, patient, or individual. As used in this disclosure, "order placement time," is a time at which a customer, client, or any individual places or has placed an order for an alimentary element, wherein placement of order may be the moment in time an order was place, or a pre-determined moment in time specified by the individual. In non-limiting illustrative examples, a plurality of alimentary items may have an order time in order of when a restaurant received orders, for instance and without limitation an online queue, wherein customers may have also disclosed expected order time instructions that may differ from when the order was placed. A "projected order completion time," as used in this disclosure, refers to a projected alimentary element arrival time to an individual. An "alimentary element destination," as used in this disclosure refers to geolocation data that corresponds to where an alimentary element is projected to arrive. In an embodiment, a destination may include a designated package storage location. A "designated package storage location," as used in this disclosure, refers to a specific, pre-defined place where packages containing alimentary elements are stored temporarily before being delivered to their final destination. A non-limiting example of a package storage location may be a package storage locker. This location is equipped to handle various types of alimentary packages, ensuring they are stored under appropriate conditions to maintain their quality and safety until pickup or delivery.

With continued reference to FIG. 1, a plurality of destinations 112 may include a first destination, which may be an aggregation/sorting center. As used in the current disclosure, an "aggregation center" is a facility where incoming alimentary elements are systematically organized and categorized based on their final destinations before being dispatched to their final destination. This center may function as a hub where alimentary elements are initially delivered and sorted based on their final destinations. The aggregation/sorting center may ensure that each item is organized and grouped for efficient distribution. This hub may act as a central point in a hub-and-spoke transportation system, streamlining the process of managing and dispatching orders. After the items have been received at the first destination they may be rerouted to a second, third, or fourth destination. An additional destination may be chosen by the user, this may be specific location where the alimentary element is ultimately delivered. This location can be a home, office, hospital room, or any place designated by the individual receiving the alimentary item. The hub-and-spoke system facilitates the efficient transportation of items from the aggregation center (the hub) to multiple end destinations (the spokes), ensuring timely and accurate deliveries. The designated package storage locations within this system are critical for maintaining the quality and safety of alimentary elements until they reach their final destination.

With continued reference to FIG. 1, a plurality of alimentary elements 108 may be received from a plurality of vendors. A "vendor," as used in this disclosure, refers to any entity that provides alimentary elements 108 for delivery. An alimentary element 108 may be received from a vendor, which could be a restaurant, grocery store, deli, fast food chain, cafeteria, or any other establishment involved in the preparation and sale of food items. These vendors are responsible for generating and packaging the alimentary elements, which may include meals, grocery items, or any food-related products that need to be delivered to a customer, client, patient, or individual. For example, a restaurant vendor may prepare and package hot meals, a grocery store vendor might pack fresh produce and other groceries, and a deli vendor could provide sandwiches and salads. Each vendor location is associated with specific details such as the address of the establishment and the projected order completion time, which indicates when the alimentary elements will be ready for pickup. This information is crucial for the computing device 104 to optimize the batching and delivery process, ensuring that all elements are efficiently grouped and delivered on time.

With continued reference to FIG. 1, each alimentary element 108 may include a vendor location. A "vendor location," as used in this disclosure, refers to the specific physical address or geolocation of a vendor from which alimentary elements 108 are prepared and dispatched for delivery. This location is integral to the delivery process, as it provides the starting point for the collection of alimentary elements. The vendor location includes precise details such as the street address, city, postal code, and any relevant coordinates (e.g., GPS data) that can be used for navigation and logistics planning. In a non-limiting example, a vendor location might be the address of a restaurant where meals are cooked and packaged for delivery, the site of a grocery store where fresh produce and other items are gathered, or the premises of a deli that prepares sandwiches and salads. The vendor location may be used for determining the projected order completion time, which indicates when the alimentary elements will be ready for pickup. This information helps the computing device 104 to accurately generate and optimize batching combinations and delivery routes, ensuring that the collection and delivery of alimentary elements are performed efficiently and on time.

Continuing in reference to FIG. 1, computing device 104 may compute, using a plurality of alimentary elements 108 and a plurality of destinations 112, a candidate batching combination 116 for a plurality of destinations 112 as a function of an objective function 120, wherein generating a candidate batching combination 116 further comprises a selection based on expected alimentary combination completion time and destination geolocation. A "candidate batching combination," as used in this disclosure, is a batch of alimentary elements, for instance and without limitation a batch of meal orders, that are grouped according to an objective function, wherein the objective function 120 is grouping elements based on the plurality of completion times and destination locations. An "objective function," as used in this disclosure, is a function, equation, or mathematical expression that may be minimized and/or maximized to some numerical value wherein, minimization and/or maximization represents identification of numerical values that most closely matches a target criterion, solution, or the like. In non-limiting illustrative examples, the objective function 120 may select elements for the candidate batching combination 116 based on minimizing distances between delivery locations for an overall minimized distance of travel for a plurality of alimentary elements 108, and/or minimizing the time from order to time to completion for a plurality of alimentary elements 108.

Continuing in reference to FIG. 1, generation of an objective function may include generation of a function to score and/or weight factors to achieve a combination score for each feasible pairing of alimentary elements. In some embodiments, pairings may be scored in a matrix for optimization, for instance and without limitation where columns represent order times and rows represent destination locations potentially paired therewith; each cell of such a matrix may represent a score of a pairing of the corresponding alimentary batch destinations and/or order completion times to the corresponding route, wherein the alimentary batches are selected based on routes with minimizing order completion times.

Continuing in reference to FIG. 1, the system 100 may be configured to select a candidate batching combination 116 of a plurality of candidate batching combinations 116. Selecting a candidate batching combination 116 may include generating a batching objective function 124 of the plurality of batching combinations 116. Batching objective function 124 may be a mathematical function with a solution set including the plurality of candidate batching combinations, as described in further detail below. Batching objective function 124 may generate an output that provides a ranking of each candidate batching combination 116 of the plurality of candidate batching combinations 116 according to at least a target criterion. Batching objective function 124 may select the candidate batching combination 116 from the plurality of batching combinations 116 for which the output of the batching objective function 124 most closely matches the at least a target criterion. Batching objective function 124 may select a plurality of batching combinations 116 selected as a plurality of feasible combination, where a feasible combination is a combination that meets one or more constraints, for instance as described in further detail below, wherein a plurality of batching combinations 116 may most closely matches the at least a target criterion.

With continued reference to FIG. 1, selecting the candidate alimentary batching combination 116 may include performing a greedy heuristic process on the batching objective function 124 A "greedy heuristic process" is defined as an algorithm that selects locally optimal choices, which may or may not generate a globally optimal solution. For instance, computing device 104 may select alimentary element pairings so that scores associated therewith are the best score for each order and/or for each batch. In such an example, optimization may determine the combination of alimentary elements such that each delivery pairing includes the highest score possible. In non-limiting illustrative examples, a greedy algorithm may accept an input of a series of alimentary orders, their order time, expected and/or requested delivery times, and destination geolocations, and determine which grouping, or batches, of alimentary items is most optimally fulfilling the overall requirements of all items.

Continuing in reference to FIG. 1, the batching objective function 124 solution target criterion may include minimizing the average time between the order placement time and the projected order completion time for the plurality of alimentary elements in the batch. The objective function 120 may accept an input of a plurality of alimentary elements 108 and a plurality of destinations 112 and generate an output of a candidate batching combination 116 of a plurality of candidate batching combinations 116 by grouping, batching, or otherwise dividing alimentary items into combinations for a delivery driver, drone, or any other suitable physical transfer apparatus, based on, for instance and without limitation, order placement time and/or destination locations; the batching objective function 124 may be the same as an objective function 120, which selects a candidate batching combination 116 and/or a plurality of batching combinations 116 based on the solution target criterion, for instance and without limitation, such as minimizing the average time between order placement time and completion of the order at the order destination. In non-limiting illustrate examples, an objective function 120 may compute a candidate batching combination 116 based upon a variety of other factors, including for instance the number of physical transfer apparatuses available, wherein how alimentary elements are batched to minimize average time may be affected by timing of pickup based on feasibility regarding the amount and availability of physical transfer apparatuses, among other factors.

Continuing in reference to FIG. 1, computing device 104 may be configured to numerically rank the batching order by destination. Ranking the batching order of a candidate batching combination 116 and/or a plurality of candidate batching combinations 116 by destination may include generating a combination ranking 128. Generating the ranking combination 128 further comprises generating a batching objective function 124 of the plurality of batching combinations. Batching objective function may be implemented in any manner described above for objective functions. Batching objective function is a mathematical function with a solution set including the plurality of candidate batching combinations. Batching objective function generates an output combination ranking 128 candidate batching combination according to at least a target criterion. In non-limiting exemplary embodiments, the target criterion may be to minimize the average time between the customer order time and the alimentary element reaching the order destination, wherein the ranking combination 128 may describe the order in which alimentary elements reach a destination or plurality of destinations to minimize the average time. In non-limiting illustrative examples, selecting a candidate batching combination 116 for which the output of the objective function 120 most closely matches the at least a target criterion may result in a combination ranking 128, wherein all alimentary elements within the candidate batching combination 116 have a ranking that informs the order in which the alimentary elements are batched and/or delivered.

Continuing in reference to FIG. 1, computing device 104 may be further configured to numerically rank the batching order by destination. Computing device 104 may numerically rank the alimentary elements of a batching combination 116 by destination, for instance and without limitation, by using a scoring function that assigns a numerical rank to an alimentary element of a batch based on where or when an alimentary element may reach its destination. In non-limiting illustrative examples, such a scoring function may be a supervised machine-learning process, as described in further detail below; alternatively or additionally, a scoring function may be an optimization algorithm, as described in further detail below. In further non-limiting illustrative examples, numerical ranking the batching order by destination may include numbering alimentary elements based on when they will reach their destination along a predicted route, for instance as illustrated in further detail in FIG. 5 below. Numerically ranking the batching order by destination may include a chronological numerical rank, a numerical rank based on cost, value, or volume of alimentary items in an individual order, or any other logical method of numerical ranking of alimentary items in a batch based on destination.

Figure 2:
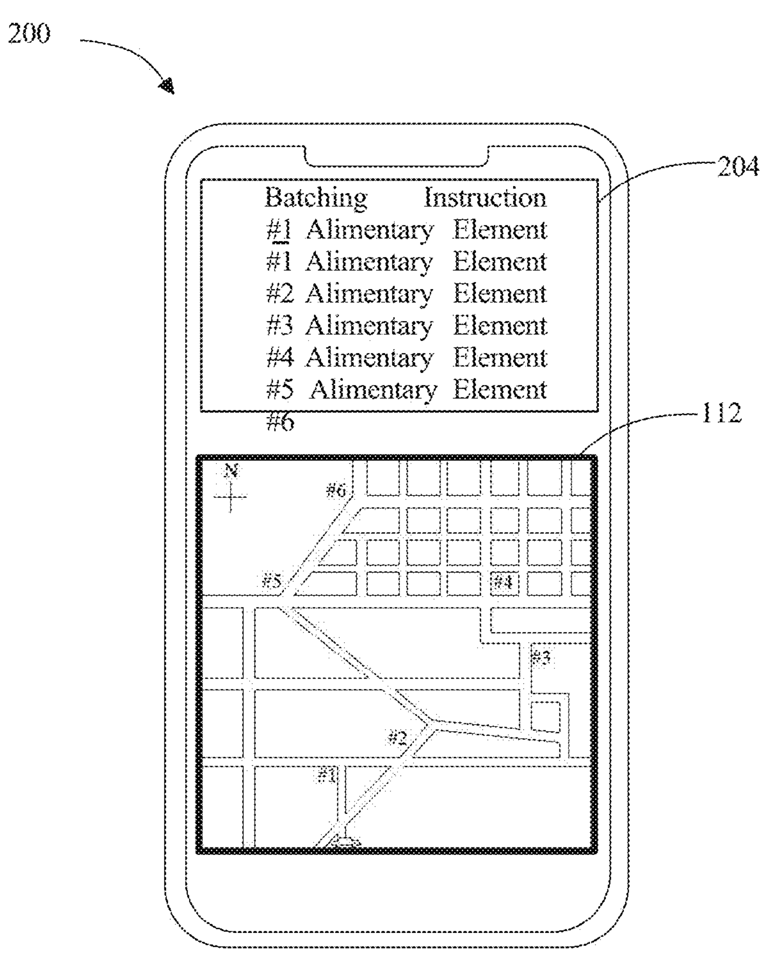
FIG. 2 is a diagrammatic representation of an exemplary embodiment of a graphical display of a batching instructions to a user device.

Referring now to FIG. 2, a non-limiting exemplary embodiment of a computing device 104 providing, to a user, batching instructions 204 based on the selected batching combinations 116 via a user device 200, is illustrated. As used in this disclosure, "batching instructions" are instructions that inform a user, such as restaurant personnel, grocers, and the like, which alimentary elements may be placed together for physical transfer. Batching instructions 204 may correspond to which alimentary elements which are categorized into a batch for physical transfer by an individual courier, apparatus, or other physical transfer device, method, or the like, based on the order in which the batched alimentary elements are predicted to reach a plurality of destinations 112. In an embodiment, an order may be placed by a user on a corresponding user device 200, as described in further detail below. Order may be placed in a web browser or an application installed on user device 200. Order information may be transmitted via a network. Destination may include location information corresponding to a location for delivery of order. For example, a location of the user device may be determined via GPS and/or other navigational facilities. A user device 200 displaying batching instructions 204 as depicted in FIG. 2, may be displayed via a graphical user interface (GUI), or any other suitable means of displaying text, graphics, or the like. In illustrative embodiments, user device 200 may display batching instructions and the cognate destination locations, which may prompt a user to select and/or deselect elements from the instructions and/or ranked list to modify the batch. Selecting and/or deselecting may be performed via a GUI, touchscreen interface, or the like. Persons skilled in the art, upon reviewing the entirety of this disclosure, will be aware of various ways in which steps, sequences of steps, instructions, and/or data may be displayed, or otherwise shared; likewise persons skilled in the art, upon reviewing the entirety of this disclosure, will be aware of various ways in which instructions may be selected or deselected by a user.

With continued reference to FIG. 2, batching instructions 204 may include a notification to a restaurant to offer food at a discounted rate during periods of high influx of group orders. When multiple orders are received in a short period, restaurants could provide a temporary discount to encourage more customers to place orders during these busy times. This strategy may help to manage demand by spreading it more evenly but also attracts more customers looking for a good deal. For example, a restaurant might offer a 10% discount on all orders received within a specific time frame when they experience a surge in group orders, incentivizing customers to order more and thereby increasing overall sales. Additionally, restaurants can offer early access to delivery routes based on a user's frequency of interaction with the restaurant. Loyal customers who frequently order from the same restaurant can be given priority in delivery routing, ensuring their orders are among the first to be delivered. This can be managed through a rewards program where frequent customers accumulate points or receive special status, granting them earlier delivery times as a perk. For instance, a customer who orders weekly from a particular restaurant might receive their orders 10-15 minutes earlier than average, reinforcing their loyalty and encouraging continued patronage.

Referring now to FIG. 1, computing device 104 may determine, using the batching instructions 204, a predicted path 132 for physical transfer of the plurality of alimentary elements, wherein determining may include using a destination machine-learning process 136 to determine a predicted path 132 to destination locations. A "predicted path," as used in this disclosure, is a route of physical transfer for an alimentary element and/or plurality of alimentary elements to reach a destination and/or a plurality of destinations. A predicted path 132 may be a single path to one or more destinations and/or may branch into multiple paths to multiple destinations. "Physical transfer," as used in this disclosure, refers to the delivery of alimentary elements via various methods. Examples of a physical transfer apparatus include personnel, such as couriers or delivery drivers, who manually transport the items to their destinations. Drones can be employed for rapid, aerial delivery, especially in urban areas or hard-to-reach locations. Autonomous vehicles, including self-driving cars or delivery robots, provide efficient and contactless delivery options. Other suitable methods for physical exchange may include bicycles for eco-friendly, short-distance deliveries or specialized food trucks equipped to maintain specific temperature conditions during transit. A destination machine-learning process 136 may accept an input of a selected batching combination 140 and a plurality of destinations 112 and order times associated with the elements of the selected batching combination 140 and determine an output that is a predicted path 132 for physical transfer of the batched alimentary elements, as described in further detail below. In such an example, a selected batching combination 140 input may include a batch of alimentary elements ranked in order of when the alimentary elements may reach their destinations to minimize average delivery time. In non-limiting illustrative examples, a destination machine-learning process 136 may alter or otherwise modify the ranking order to determine a predicted path that further minimizes the average time of delivery of a plurality of alimentary elements, for instance with a branched predicted route and/or rearranging the order of the rank after a first alimentary element has reached its destination.

With continued reference to FIG. 1, computing device 104 may select the physical transfer apparatus based on a priority metric. A "priority metric," for the purpose of this disclosure, is a parameter that allows users to select a priority level for delivery based on the speed of delivery. Users can pay more for a higher priority delivery, which may translate to a faster delivery speed compared to standard options. This priority metric may account for the urgency and time-sensitivity of the delivery, ranking orders to prioritize those with higher urgency. For instance, a high-priority delivery may be expedited using faster transfer methods such as drones or dedicated delivery personnel, while lower-priority deliveries may be grouped or batched together to optimize resources. By incorporating the priority metric, the destination machine-learning process 136 can adjust the predicted path 132 to ensure that higher-priority deliveries reach their destinations more quickly, effectively managing and optimizing delivery times to meet user expectations and service level agreements. In an embodiment, when the destination machine-learning process 136 evaluates multiple candidate batching combinations 140, it may consider the priority metric to rank these combinations. Specifically, a candidate batching combination that includes high-priority deliveries will be ranked higher than those with standard or lower-priority deliveries. This ranking is influenced by the priority level assigned to each order, with higher-priority orders receiving expedited handling. For instance, if a candidate batching combination includes several high-priority orders that require faster delivery, the machine-learning process may prioritize this combination. It may allocate the most efficient and fastest physical transfer apparatus, such as drones or dedicated couriers, to ensure timely delivery. Conversely, combinations with lower-priority orders may be batched together to optimize resources and minimize costs, using slower delivery methods if necessary. By incorporating the priority metric, the system can dynamically adjust the ranking of candidate batching combinations, ensuring that high-priority deliveries are handled with the urgency they require. This process helps in managing delivery schedules effectively, reducing overall delivery times for urgent orders, and maintaining customer satisfaction by meeting varied delivery expectations.

With continued reference to FIG. 1, computing device 104 may determine, using the batching instructions 204, a predicted path 132 for the physical transfer of the plurality of alimentary elements as a function of a tipping rate. Processor 104 may establish standard tipping rates for delivery services can act as a significant incentive for delivery personnel to accept more orders. By setting a baseline tipping rate, restaurants and delivery platforms can ensure that delivery personnel are adequately compensated for their time and effort. This baseline could be adjusted based on factors such as delivery distance, time of day, and order complexity. For instance, a standard tip might be 10-15% of the order total, with higher percentages for longer distances or rush hour deliveries. This structured approach to tipping not only motivates delivery personnel to take on more orders but also standardizes customer expectations regarding tipping, fostering a more consistent and reliable delivery experience. In addition to tipping, a discounting system can be implemented for increments of time that a user has to wait beyond a normal threshold. For example, if the standard delivery time is set at 30 minutes, users could receive a discount for every additional 10 minutes they wait past this threshold. This discount could be a fixed amount or a percentage of the total order value, compensating customers for their patience and helping to maintain customer satisfaction even in cases of delayed deliveries. This approach ensures that customers feel valued and are less likely to be dissatisfied due to longer wait times.

Continuing in reference to FIG. 1, computing device 104 may determine, using the batching instructions 204, a predicted path 132 that is updated as a function of each alimentary element that has reached its destination. Updating a predicted path 132 may be performed by inputting a selected batching combination 140 and plurality of destinations 112 corresponding to a predicted path into a destination machine-learning process 136 after a destination and alimentary element has been eliminated due to completing the order. A destination machine-learning process 136 may then generate and output that is an updated predicted path 132, as described in further detail below. An updated predicted path 132 may not change from the route set in the predicted path 132 prior to reaching a destination.

Figure 3:
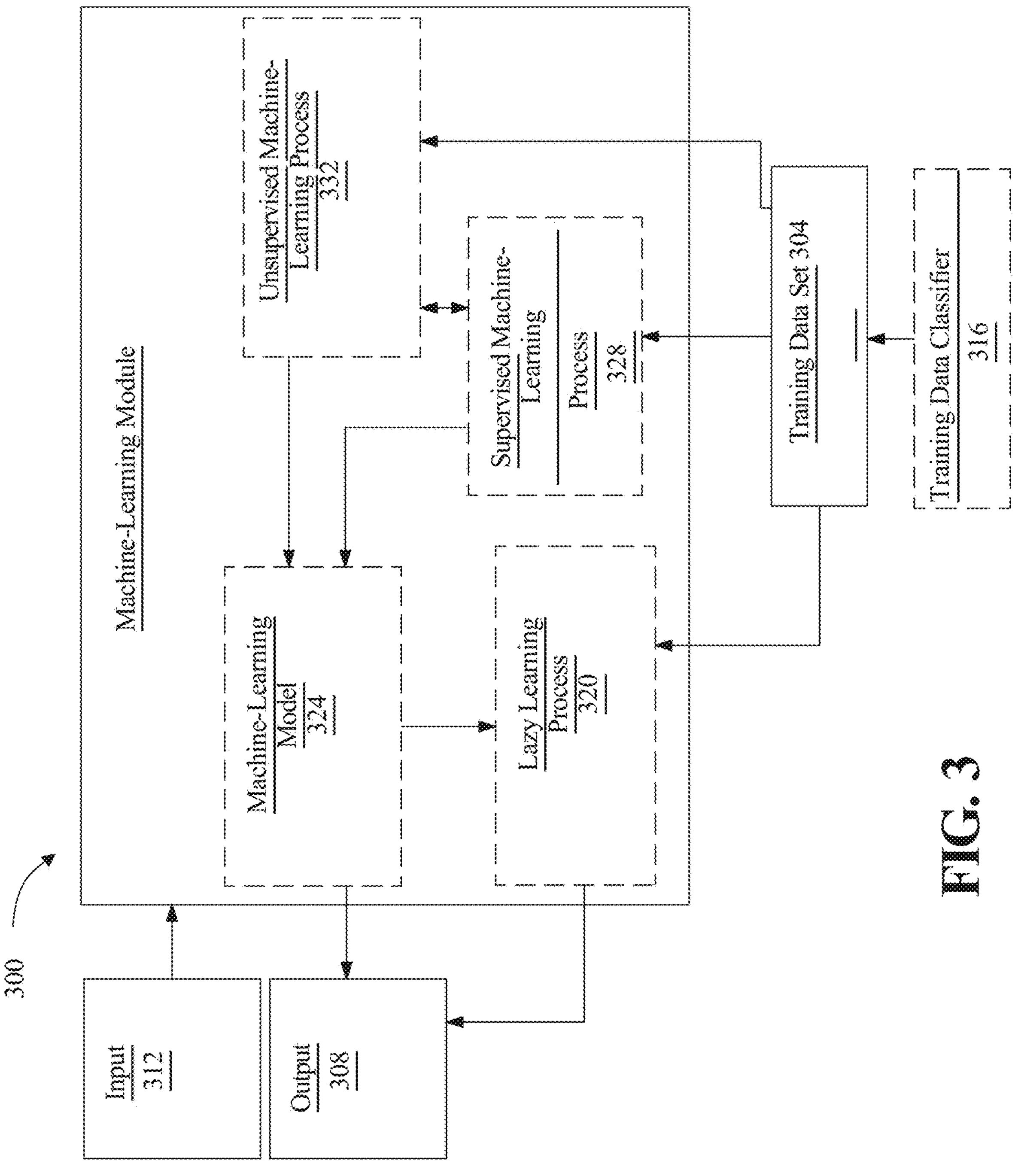
FIG. 3 is a block diagram illustrating an exemplary embodiment of a machine-learning module.

Referring now to FIG. 3, an exemplary embodiment of a machine-learning module 300 that may perform one or more machine-learning processes as described in this disclosure is illustrated. Machine-learning module may include any suitable machine-learning module which may perform determinations, classification, and/or analysis steps, methods, processes, and the like as described in this disclosure using machine learning processes, such as a destination machine-learning process 136. A "machine learning process," as used in this disclosure, is a process that automatedly uses training data set 304 containing training data to generate an algorithm that will be performed by a computing device/module to produce outputs 308 given data provided as inputs 312; this is in contrast to a non-machine learning software program where the commands to be executed are determined in advance by a user and written in a programming language.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, and the like. Machine-learning module 300 may generate a classifier using a classification algorithm, defined as a process whereby a computing device and/or any module and/or component operating thereon derives a classifier from training data set 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to match one or more categories including elements of user data and/or constitutional data, such as without limitation a cohort of persons and/or other analyzed items and/or phenomena for which a subset of training data may be selected.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data set 304. Heuristic may include selecting some number of highest-ranking associations and/or training data set 304 elements. Lazy learning may implement any suitable lazy learning algorithm, including without limitation a K-nearest neighbors algorithm, a lazy naïve Bayes algorithm, and the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data set 304 are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as "deep learning".

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include selected batching combinations 140 as described above as inputs, predicted paths 132 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data set 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, and the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus a term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data set 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data set 304.

Referring again to FIG. 1, determining the predicted path for a plurality of destinations may include receiving a batched order, wherein order reflects the order in which the plurality of alimentary elements must reach a plurality of destinations, and retrieving geolocation data corresponding to current position of at least an alimentary element and the alimentary element destination location. Alternatively or additionally, destination machine-learning process 136 may determine additional rankings of alimentary elements in a batched order other than the original ranking received in a batched order. In such an example, a destination machine-learning process 136 may re-rank elements, for instance and without limitation, based upon predicted paths that further minimize average time between order of alimentary elements and alimentary elements reaching their destinations. In non-limiting illustrative examples, a destination machine-learning model 136 may accomplish such a task by simulating routes between alimentary delivery points and calculating overall physical transfer time based on geolocations and other factors, such as traffic, weather, time of day, physical transfer method, and the like. In further non-limiting illustrative examples, a destination machine-learning model 136 may accomplish such a task by using a least square approach, as described above, where difference in order time destination arrival are calculated and minimized for a batched order based on selecting different predicted paths until a solution results in minimized difference between order placement and destination arrival. Batched orders, alimentary elements, and/or geolocation data may be stored and/or retrieved from a path database 144, as described in further detail below.

Figure 4:
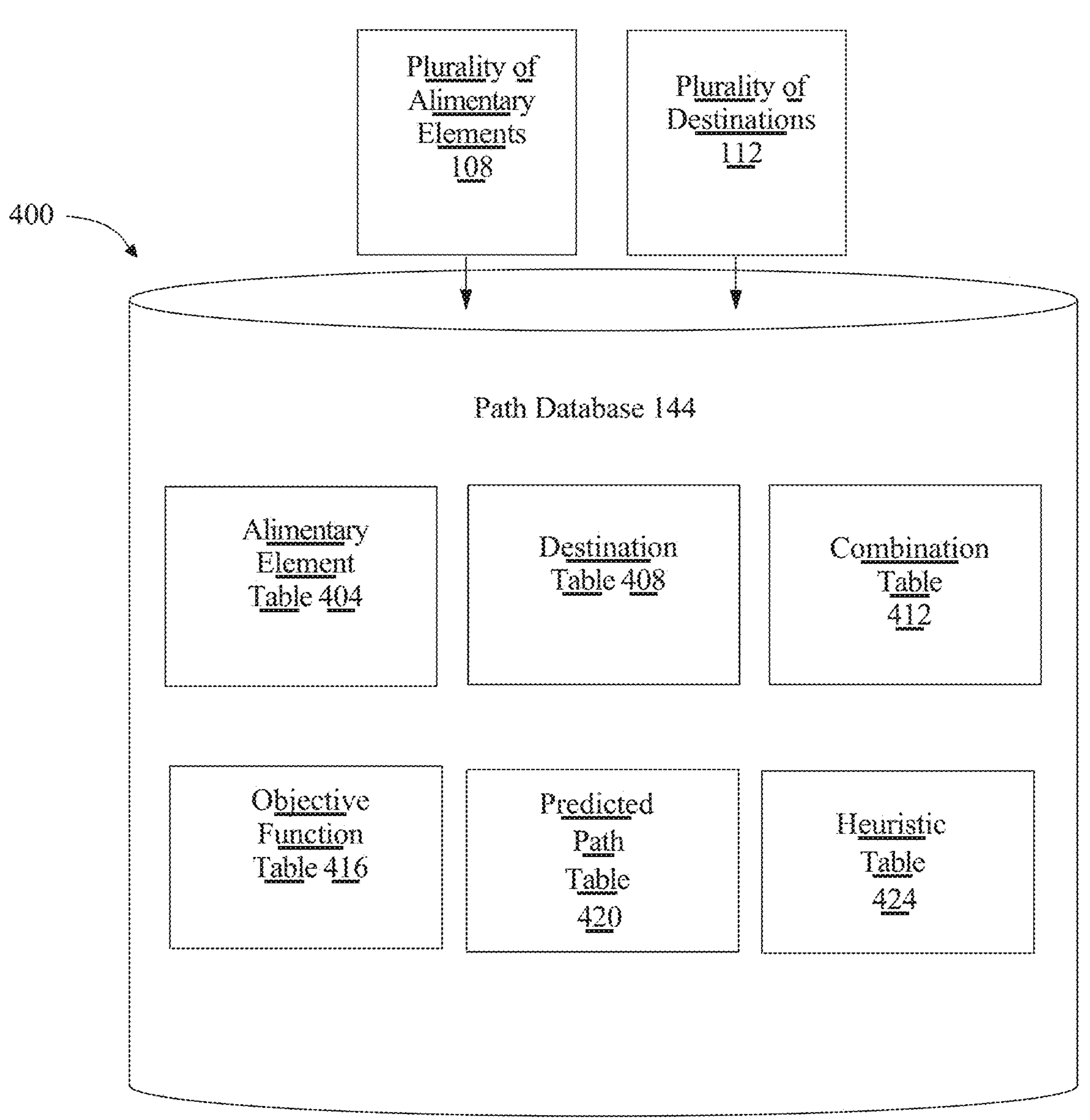
FIG. 4 is a block diagram illustrating an exemplary embodiment of a path database.

Referring now to FIG. 4, a non-limiting exemplary embodiment 400 of a path database 144 is illustrated. Path database 144 may be implemented, without limitation, as a relational database, a key-value retrieval database such as a NOSQL database, or any other format or structure for use as a database that a person skilled in the art would recognize as suitable upon review of the entirety of this disclosure. Path database 144 may alternatively or additionally be implemented using a distributed data storage protocol and/or data structure, such as a distributed hash table and the like. Path database 144 may include a plurality of data entries and/or records, as described above. Data entries in a path database 144 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 4, path database 144 may include, without limitation, an alimentary element table 404, destination table 408, combination table 412, objective function table 416, path table 420, and/or heuristic table 424. Determinations by a machine-learning process, machine-learning model, and/or scoring function may also be stored and/or retrieved from the path database 144, for instance in non-limiting examples a classifier describing a plurality of destinations 108 as it relates to a predicted path 132. Determinations by a machine-learning model for calculating a predicted path 132 and/or a rankings of a batched order based on geolocation may also be stored and/or retrieved from the path database 144. As a non-limiting example, path database 144 may organize data according to one or more instruction tables. One or more path database 144 tables may be linked to one another by, for instance in a non-limiting example, common column values. For instance, a common column between two tables of path database 144 may include an identifier of a submission, such as a form entry, textual submission, global position system (GPS) coordinates, addresses, and the like, for instance as defined below; as a result, a query may be able to retrieve all rows from any table pertaining to a given submission or set thereof. Other columns may include any other category usable for organization or subdivision of expert data, including types of expert data, names and/or identifiers of experts submitting the data, times of submission, and the like; persons skilled in the art, upon reviewing the entirety of this disclosure, will be aware of various ways in which data from one or more tables may be linked and/or related to data in one or more other tables.

Still referring to FIG. 4, in a non-limiting embodiment, one or more tables of a path database 144 may include, as a non-limiting example, an alimentary element table 404, which may include meals, grocery items, food elements, or the like, generated by a restaurant, cafeteria, fast food chain, grocery store, deli, and any associated data relating to an order by a customer, client, patient, or individual, including when the order was placed, what alimentary elements were in the order, and/or linked to other data such as the order destination geolocation data for an alimentary element, for use in determining projected alimentary combinations 116, batching, and/or other elements of data computing device 104 and/or system 100 may store, retrieve, and use to determine usefulness and/or relevance of data in determining projected alimentary combinations 166, batching instructions 204, predicted paths 132, selected batching combinations 140 and/or training data for machine learning processes, as described in this disclosure. One or more tables may include destination table 408, which may include a history of numerical values, GPS coordinates, addresses, timestamps, and the like, for instance and without limitation, that link an alimentary element order time and destination geolocation, for instance in determining a predicted path 132. One or more tables may include a combination table 412, which may correlate alimentary element rankings, scores, and/or other alimentary data as it pertains to a combinations of items based on order time, destination location, batching order, and the like, including any outcomes, models, heuristics, scores and/or combinations thereof as they may correspond to rankings or combinations of items listed as numerical values, metrics, functions, vectors, matrices, and the like, that corresponds to batching instructions and/or inputs for a machine-learning process in determining a predicted path 132. One or more tables may include, without limitation, an objective function table 416 which may contain one or more inputs identifying one or more categories of data, for instance an algorithm for calculating a ranking of items to generate a batching instruction, and/or ranking of destinations in a predicted path 132, and the like. One or more tables may include, without limitation, a predicted path table 420 which may contain one or more inputs identifying one or more categories of data, for instance subsets of physical transfer paths, effectiveness of previous paths, and the associated effects of weather, traffic, and the like, on predicted paths with regard to training and/or generation of objective functions, machine-learning models, scoring functions, ranking functions, and/or geolocation instructions as a result of, for instance and without limitation, outputting elements and/or other path data input elements. One or more tables may include, without limitation, a heuristic table 424, which may include one or more inputs describing potential mathematical relationships between at least an element of user data and, for instance and without limitation, batching instructions, and rankings thereof, and/or predicted paths and how they may change as a function of reaching particle areas of a map, as described in further detail below.

Referring now to FIG. 1, computing device 104 may determine a predicted path 132 for the plurality of alimentary combinations of a batch in the order in which the alimentary elements are expected to arrive at a plurality of destination locations and may include updating the predicted path 132 as a function of each alimentary element reaching its destination. Computing device 104 may iteratively updated a predicted path 132 as a function of the alimentary elements that reach their destination. In non-limiting illustrative examples, once an alimentary element has reached a destination the new calculated minimized average order completion time may dictate or otherwise suggest that a new ranking of delivery be adopted. In such an example, the predicted path 132 may be updated as a physical transfer apparatus is en route. For further non-limiting illustrative examples, a physical transfer apparatus may encounter a detour and/or vehicle accident, and the destination machine-learning process 136 may automatically update the predicted path 132 by determining a new path, as described above, and display the updated path directly to the physical transfer apparatus, as described in further detail below.

Figure 5:
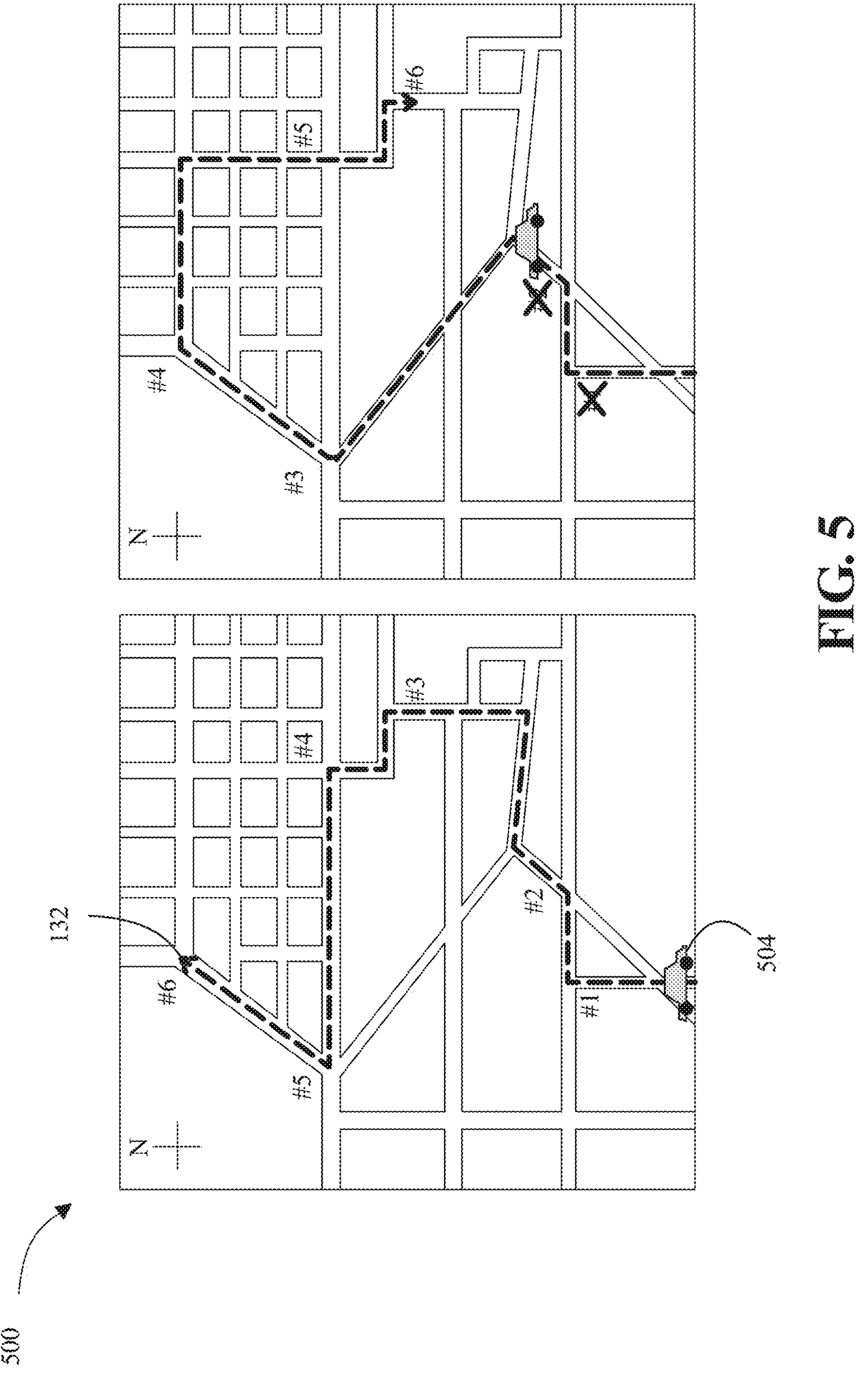
FIG. 5 is a diagrammatic representation of a predicted path updated as a function of physical transfer apparatus movement.

Referring not to FIG. 5, an exemplary embodiment 500 of a predicted route 132 updated as a function of each alimentary element reaching its destination is illustrated. A selected batching combination 140 destinations are shown on a map, with geolocations numbered 1-6. Prior to a physical transfer apparatus 504 arriving at a first destination as shown in the left panel, a predicted route 132 (denoted as a dashed line) may indicate the most optimal path based on minimizing the average time between the order completion time and predicted destination arrival for a batch of alimentary elements. After completing at least an order, as shown in the right panel, the predicted path 132 may change based on new calculations of the most optimal path based on minimizing the average time between the order completion time and predicted destination arrival for a the remainder of the batch of alimentary elements. Alternatively or additionally in non-limiting examples, if a new batch of alimentary elements has been queued at a location, a computing device 104 determining a predicted path 132 may factor in minimizing the time between, for instance and without limitation, arriving at a final destination of a batch and returning to a restaurant location. In such an example, as depicted in FIG. 5, the predicted path 132 may change (from left panel to right) to move the last destination (#6) closer to where a physical transfer apparatus may have originally departed for minimizing the time in accepting a second batching combination 140.

Continuing in reference to FIG. 1, computing device 104 may determine the predicted path 132 using a mapping algorithm 148 and the geolocation data to determine a path that minimizes, for a plurality of batched alimentary combinations, the average order completion time. The "geolocation data," may refer to the plurality of destination data 112 that corresponds to the plurality of alimentary elements 108, including the current location from which a physical transfer apparatus 504 may obtain the alimentary elements. A mapping algorithm 148 may be formulated as a linear objective function. Which computing device 104 may solve using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is the set of all paths r, S is a set of all alimentary elements of a batched order s, $c_{rs}$ is a score of a pairing of a given path with a given combination of alimentary elements, and $x_{rs}$ is 1 if a route r is paired with physical transfer apparatus 504 *s*, and 0 otherwise. Continuing the example, constraints may specify that each alimentary element is assigned to only one batch, and each batch is assigned only one physical transfer apparatus 504. Batches of alimentary elements may be optimized for a maximum score combination of all generated combinations, with selection based on a value indicating an optimized combination. In various embodiments, system 100 may determine combination of alimentary elements that maximizes a total score subject to a constraint that all deliveries are paired to exactly one physical transfer apparatus 504. Not all physical transfer apparatuses 504 may receive a selected batching combination 140 pairing since each delivery may only be delivered by one physical transfer apparatus 504. A mathematical solver may be implemented to solve for the set of feasible paths that maximizes the sum of scores across all pairings; mathematical solver may implemented on computing device 104 and/or another device in system 100, and/or may be implemented on third-party solver.

With continued reference to FIG. 1, mapping algorithm 148 may include minimizing a loss function, where a "loss function" is an expression an output of which an optimization algorithm minimizes to generate an optimal result. As a non-limiting example, computing device 104 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate alimentary combinations; size may, for instance, include absolute value, numerical size, or the like. Selection of different loss functions may result in identification of different potential pairings as generating minimal outputs. Objectives represented in a mapping algorithm 148 and/or loss function may include minimization of delivery times. Objectives may include minimization of wait times by physical transfer apparatuses 504 at alimentary providers; wait times may depend, for instance and without limitation, on alimentary preparation times, expected order completion time, and/or destination geolocation, as described above. Objectives may include minimization of average times of order completion times in excess of estimated or requested arrival times.

An objective function may be implemented in a similar manner to first objective function 120. A mapping algorithm 148 may be an objective function 120 as described above, and/or as described in U.S. Nonprovisional application Ser. No. 16/890,839, filed on Jun. 2, 2020, and entitled "METHODS AND SYSTEMS FOR PATH SELECTION USING VEHICLE ROUTE GUIDANCE FIELD OF THE INVENTION," the entirety of which is incorporated herein by reference. A machine-learning process, such as destination machine-learning process 136 may call such an algorithm and run it for one or more steps in deciding when an alimentary element has been dropped off, delivered, canceled, or otherwise removed from the batching queue.

Continuing in reference to FIG. 1, computing device 104 determining the predicted path further comprises storing a plurality of previously determined predicted paths in a database for subsequent path determination. For instance and without limitation, the destination machine-learning process 136 may determine when to retrieve and "branch off", or otherwise build from, previous routes-especially if orders are region-specific or represent repeat locations. Machine-learning processes may decide whether retrieving previously predicted paths 132 from a path database 112 will result in minimized delivery times and/or to build a predicted path 132 de novo, for instance if there are repeat orders to businesses, residential addresses, and the like, but the batching order is significantly different.

Figure 6:
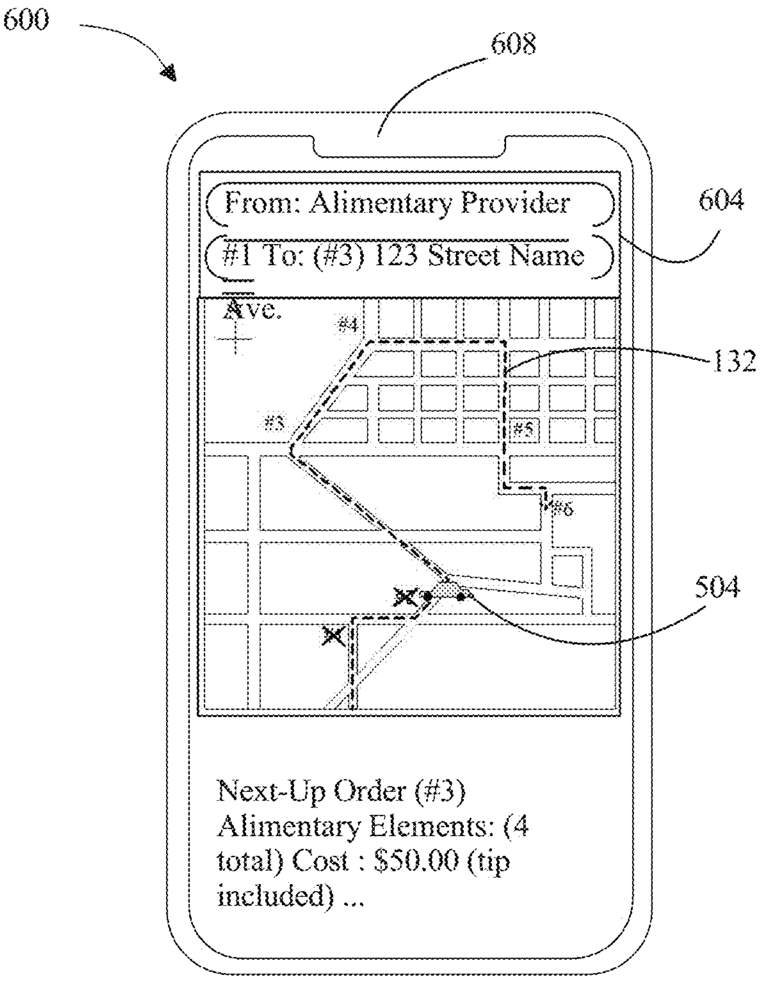
FIG. 6 is a diagrammatic representation of an exemplary embodiment of a graphical display of a predicted path and geolocation data to a physical transfer device.

Referring now to FIG. 6, an exemplary embodiment 600 of a computing device 104 providing a path to the physical transfer apparatus 504 may include providing geolocation data 604 that corresponds to destination locations where the apparatus is expected to follow sent to a physical transfer device 608, is illustrated. Physical transfer device 608 may be a user device such as a smartphone, tablet, or other user device intended to be used by delivery driver or other personnel, as described above in FIG. 2. Alternatively or additionally, physical transfer device 608 may be integrated into a transit apparatus such as a computing device 104 and/or vehicle navigation in a car, truck, or the like. In further non-limiting illustrative examples, physical transfer device 608 may be a computing device 104 and/or navigation system of a drone, like an un-manned aerial vehicle, that may communicate with system 100 wirelessly, via a network, or the like, as described in further detail below.

Figure 7:
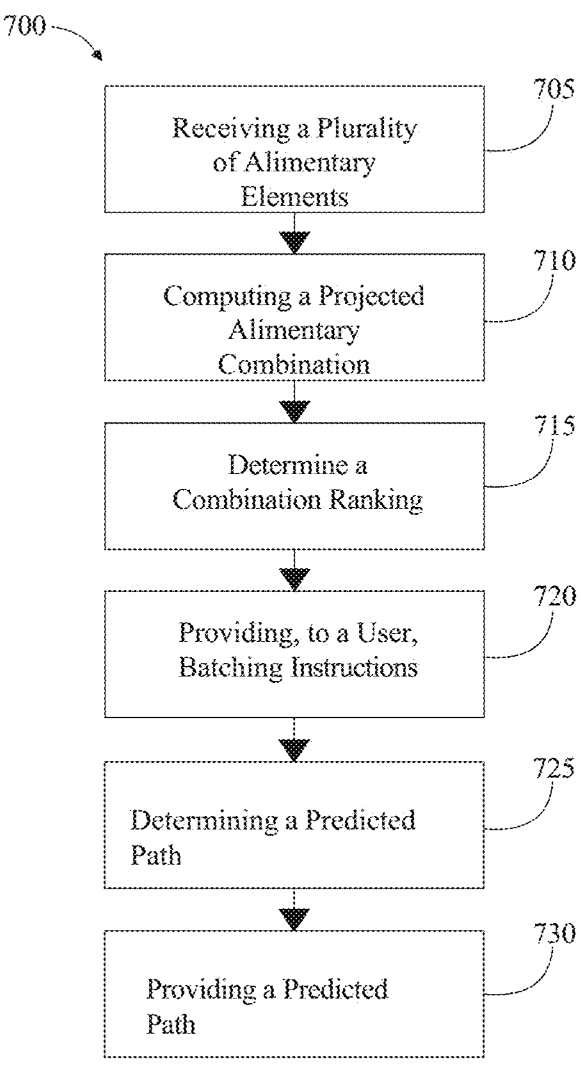
FIG. 7 is a flow diagram illustrating an exemplary workflow of a method for path selection.

Referring now to FIG. 7, an exemplary embodiment of a method 700 for path selection is illustrated. At step 705, computing device 104 may receive a plurality of alimentary elements 108 and a plurality of destinations 112. Receiving a plurality of alimentary elements 108 and a plurality of destinations 112 may include receiving data corresponding to order placement time of alimentary elements, projected order completion time of alimentary elements, and alimentary element destination; this may be implemented, without limitation, as described above in reference to FIGS. 1-6.

With continued reference to FIG. 7, at step 710, computing device 104 may compute, using a plurality of alimentary elements 108 and a plurality of destinations 112, a candidate batching combination 116 for a plurality of destinations 112 as a function of an objective function 120, wherein computing a candidate batching combination 116 may include a selection based on expected alimentary combination completion time and destination geolocation; this may be implemented, without limitation, as described above in reference to FIGS. 1-6.

With continued reference to FIG. 7, at step 715, computing device 104 may determine a combination ranking 128 wherein determining the ranking may include generating a batching objective function 124 of the plurality of batching combinations, wherein the batching objective function 124 is a mathematical function with a solution set including the plurality of candidate batching combinations 116 and the batching objective function 124 generates an output ranking the candidate batching combination 116 according to at least a target criterion, and selecting a candidate batching combination 116 for which the output of the batching objective function 124 most closely matches the at least a target criterion. Selecting the candidate alimentary batching combination 116 may include performing a greedy heuristic process on the objective function. The batching objective function 124 solution target criterion further comprises minimizing the average time between the order placement time and the projected order completion time for the plurality of alimentary elements in the batch. The computing device 104 is further configured to numerically rank the batching order by destination; this may be implemented, without limitation, as described above in reference to FIGS. 1-6.

With continued reference to FIG. 7, at step 720, computing device 104 may provide, to a user, batching instructions 204 based on the selected batching combinations. Providing the batching instructions to the maker may include providing the batching instructions via a user device 200, wherein the batching instructions 204 correspond to which alimentary elements are placed in the batch and the order in which the batched alimentary combination must reach a plurality of destinations; this may be implemented, without limitation, as described above in reference to FIGS. 1-6.

With continued reference to FIG. 7, at step 725, computing device 104 may determine, using the batching instructions 204, a predicted path 132 for physical transfer of the plurality of alimentary elements 108, wherein determining may include using destination machine-learning process 136 to determine a predicted path 132 to destination locations, wherein the predicted path 132 is updated as a function of each alimentary element that has reached its destination. Determining the predicted path 132 for a plurality of destinations may include receiving a batched order, wherein order reflects the order in which the plurality of alimentary elements must reach a plurality of destinations. Computing device 104 may retrieve geolocation data corresponding to current position of at least an alimentary element and the alimentary element destination location to determine a predicted path 132 for the plurality of alimentary combinations of a batch in the order in which the alimentary elements are expected to arrive at a plurality of destination locations. Computing device 104 may update the predicted path 132 as a function of each alimentary element reaching its destination. Determining the predicted path 132 may include using a mapping algorithm 148 and the geolocation data to determine a path that minimizes, for a plurality of batched alimentary combinations, the average order completion time. Determining the predicted path 132 may include storing a plurality of previously determined predicted paths 132 in a database, such as a path database 112, for subsequent path determination; this may be implemented, without limitation, as described above in reference to FIGS. 1-6.

With continued reference to FIG. 7, at step 730, computing device 104 may provide, to physical transfer apparatus 504, a predicted path for the plurality of alimentary elements and the plurality of destination locations. Providing a path to physical transfer apparatus further comprises providing geolocation data that corresponds to destination locations where the apparatus is expected to follow sent to a user device; this may be implemented, without limitation, as described above in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
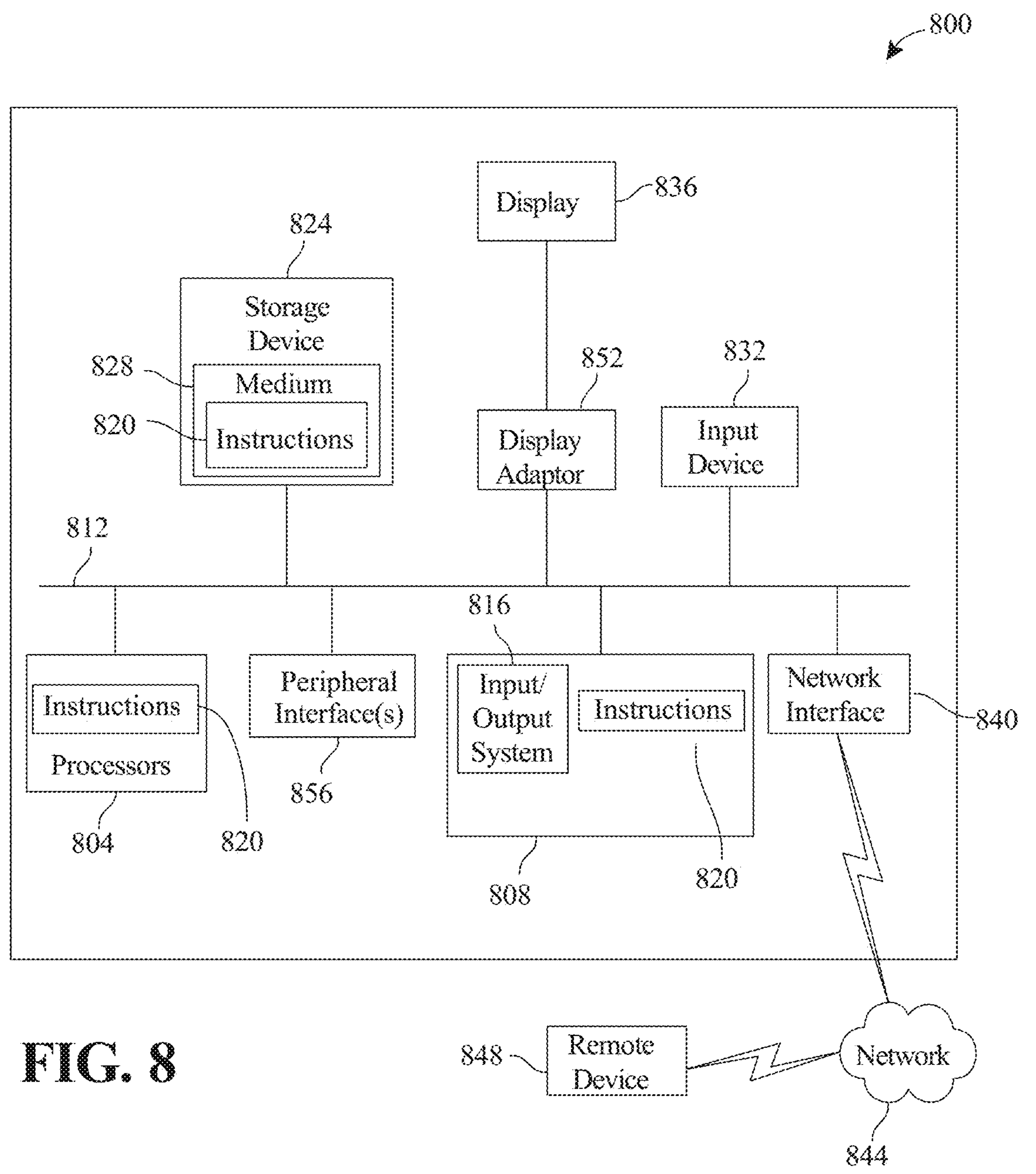
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for path selection, the system comprising a computing device, wherein the computing device is configured to:

receive a plurality of alimentary elements from two or more vendors, wherein each alimentary element of the plurality of alimentary elements further comprises:

a vendor location; and a projected order completion time;

receive at least one destination;

select a candidate batching combination as a function of the plurality of alimentary elements, wherein selecting the candidate batching combination comprises:

generating an objective function configured to group the plurality of alimentary elements as a function of the projected order completion times and the vendor locations that correspond to each respective alimentary element;

optimizing the objective function as a function of a target criterion; and selecting the candidate batching combination as a function of the optimized objective function;

provide, to a user, batching instructions based on a selected batching combination of the plurality of batching combinations, wherein the batching instructions comprises a suggestion for a discounted rate;

determine a predicted path for physical transfer of the selected batching combination using a destination machine-learning process;

select a physical transfer apparatus as a function of the candidate batching combination;

transmit the predicted path to the physical transfer apparatus;

update the predicted path after retrieving each alimentary element of the plurality of alimentary elements from the corresponding vendor location using the destination machine-learning process; and deliver the plurality of alimentary elements to the at least one destination as a function of the updated predicted path using the physical transfer apparatus.

2. The system of claim 1, wherein the plurality of alimentary elements further comprises:

a first alimentary element from a first vendor; and a second alimentary element from a second vendor.

3. The system of claim 1, wherein the at least one destination comprises a package storage location.

4. The system of claim 1, wherein selecting the physical transfer apparatus comprises selecting the physical transfer apparatus as a function of a priority metric.

5. The system of claim 4, wherein selecting the physical transfer apparatus comprises providing the physical transfer apparatus early access to the predicted path.

6. The system of claim 1, wherein the target criterion further comprises minimization of an average time between an order placement time and a projected order completion time for the plurality of alimentary elements.

7. The system of claim 1, wherein the system further comprises modifying, using the destination machine-learning process, a ranking of alimentary elements corresponding to the grouped batch of alimentary elements of the selected batching combination.

8. The system of claim 1, wherein transmitting the predicted path to physical transfer apparatus further comprises providing geolocation data to a user device.

9. The system of claim 1, wherein determining the predicted path for the plurality of destinations further comprises:

receiving a batched order, wherein the batched order reflects an order in which the plurality of alimentary elements must reach a plurality of destinations;

retrieving geolocation data corresponding to current position of at least an alimentary element and the alimentary element destination location; and determining a predicted path for the plurality of alimentary combinations of a batch in the order in which the alimentary elements are expected to reach a plurality of destination locations.

10. A method for path selection, the method comprises:

receiving, using a computing device, a plurality of alimentary elements from two or more vendors, wherein each alimentary element of the plurality of alimentary elements further comprises:

a vendor location associated with each alimentary element; and a projected order completion time;

receiving, using the computing device, at least one destination;

selecting, using the computing device, a candidate batching combination as a function of the plurality of alimentary elements, wherein selecting the candidate batching combination comprises:

generating an objective function configured to group the plurality of alimentary elements as a function of the projected order completion times and the vendor locations that correspond to each respective alimentary element;

optimizing the objective function as a function of a target criterion; and selecting the candidate batching combination as a function of the optimized objective function;

providing, using the computing device, batching instructions to a user based on a selected batching combination of the plurality of batching combinations, wherein the batching instructions comprises a suggestion for a discounted rate;

determining, using the computing device, a predicted path for physical transfer of the selected batching combination using a destination machine-learning process;

selecting, using the computing device, a physical transfer apparatus as a function of the candidate batching combination;

transmitting, using the computing device, the predicted path to the physical transfer apparatus;

updating, using the computing device, the predicted path after retrieving each alimentary element of the plurality of alimentary elements from the corresponding vendor location of a plurality of vendor locations using the destination machine-learning process; and delivering, using the computing device, the plurality of alimentary elements to the at least one destination as a function of the updated predicted path using the physical transfer apparatus.

11. The method of claim 10, wherein the plurality of alimentary elements further comprises:

a first alimentary element comprising a meal from a first vendor; and a second alimentary element comprising grocery items from a second vendor.

12. The method of claim 10, wherein the at least one destination comprises a package storage location.

13. The method of claim 10, wherein selecting the physical transfer apparatus comprises selecting the physical transfer apparatus as a function of a priority metric.

14. The method of claim 13, wherein selecting the physical transfer apparatus comprises providing the physical transfer apparatus early access to the predicted path.

15. The method of claim 10, wherein the target criterion further comprises minimization of an average time between an order placement time and a projected order completion time for the plurality of alimentary elements.

16. The method of claim 10, wherein the method further comprises modifying, using the destination machine-learning process, a ranking of alimentary elements corresponding to the grouped batch of alimentary elements of the selected batching combination.

17. The method of claim 10, wherein transmitting the predicted path to physical transfer apparatus further comprises providing geolocation data to a user device.

18. The method of claim 11, wherein determining the predicted path for the plurality of destinations further comprises:

receiving a batched order, wherein the batched order reflects an order in which the plurality of alimentary elements must reach a plurality of destinations;

retrieving geolocation data corresponding to current position of at least an alimentary element and the alimentary element destination location; and determining a predicted path for the plurality of alimentary combinations of a batch in the order in which the alimentary elements are expected to reach a plurality of destination locations.

* * * * *